(No Model.)

W. C. FOSTER.
VELOCIPEDE.

No. 526,775. Patented Oct. 2, 1894.

Witnesses

Inventor
William C. Foster.
By R.S. & A.P. Lacey
Attorneys

UNITED STATES PATENT OFFICE.

WILLIAM C. FOSTER, OF LA CROSSE, WISCONSIN.

VELOCIPEDE.

SPECIFICATION forming part of Letters Patent No. 526,775, dated October 2, 1894.

Application filed June 7, 1894. Serial No. 513,765. (No model.)

*To all whom it may concern:*

Be it known that I, WILLIAM C. FOSTER, a citizen of the United States, residing at La Crosse, in the county of La Crosse State of Wisconsin, have invented certain new and useful Improvements in Velocipedes; and I do hereby declare the following to be a full, clear, and exact description of the invention, such as will enable others skilled in the art to which it appertains to make and use the same.

This invention relates generally to velocipedes and is a combined velocipede and wagon intended for children's use.

Heretofore velocipedes have been constructed with a wagon attachment at the rear but the device could only be propelled as an ordinary velocipede.

The object of my invention is to provide a device that can be used interchangeably as a velocipede and wagon and this I accomplish by making the handle bar independent of the fork, and so arranging the same that when held up it can be used as a handle bar or steering head, and when turned down can be used as a tongue to draw the wagon along.

My invention consists also in providing a novel form of connection between the wheel, fork and wagon body whereby a seat frame is secured, and my invention consists further in certain details of construction and peculiarities of combination all of which will be fully described and then designated in the appended claims.

Figure 1:
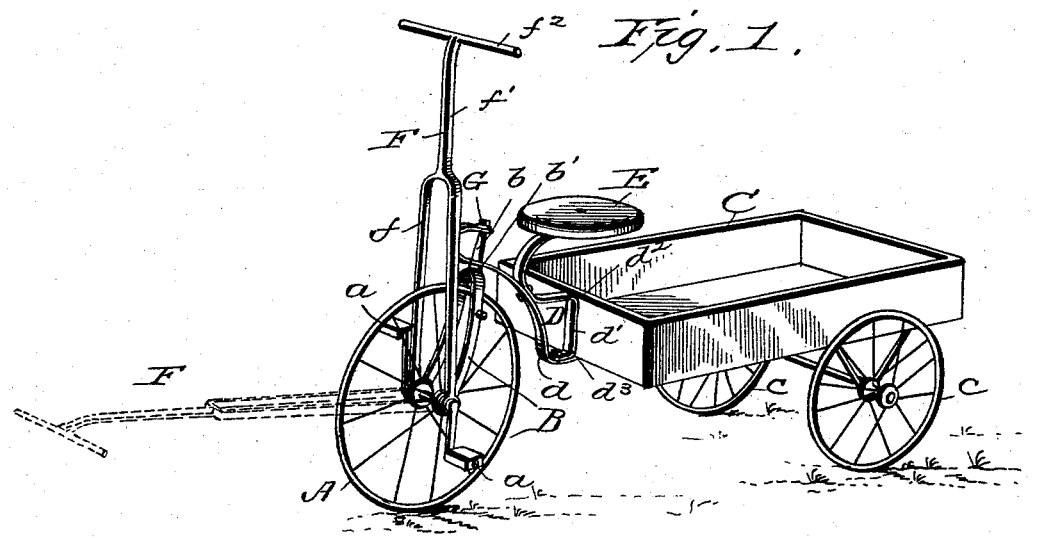
Figure 2:
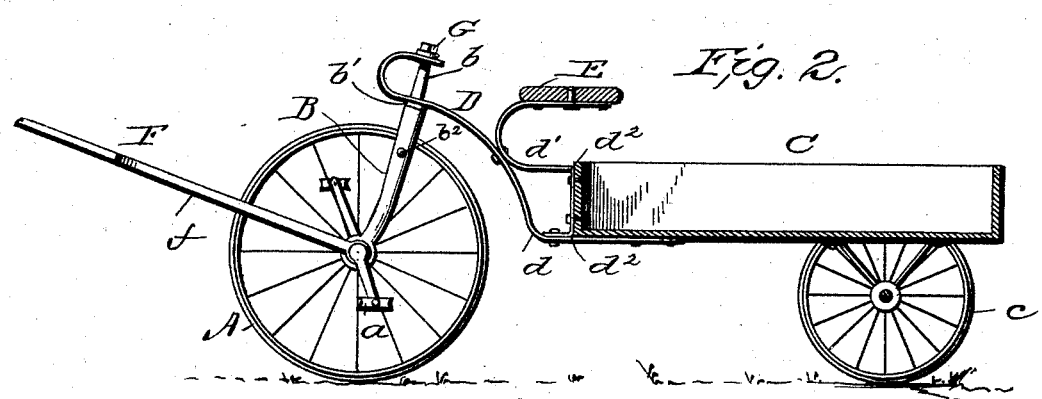
Figure 3:
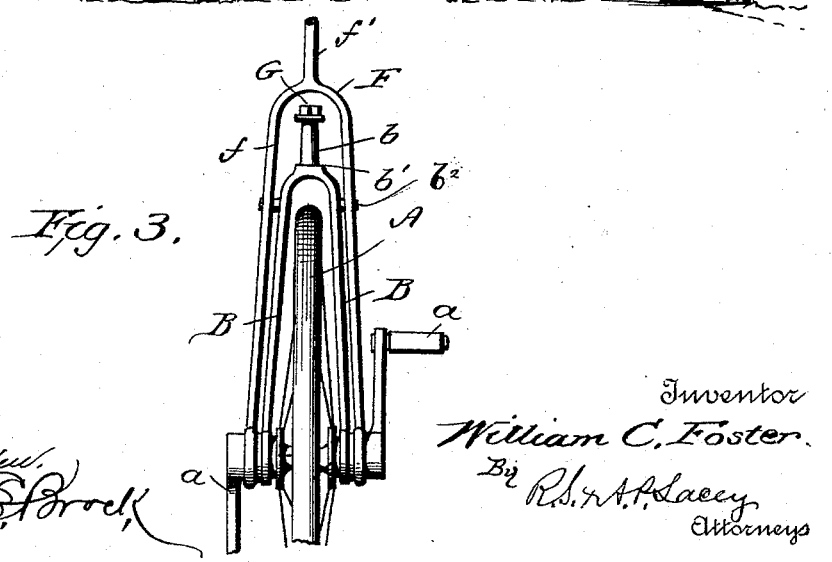

In the drawings accompanying this specification and forming a part thereof:—Figure 1 is a perspective view of my improved device, the handle bar being shown up in full lines and down in dotted lines, ready for use as a tongue. Fig. 2 is a sectional view. Fig. 3 is a front view of the wheel and handle bar.

In constructing a combination velocipede and wagon embodying my invention I employ a front wheel A which acts as a propulsion wheel and has its axle provided with crank pedals the same as an ordinary velocipede wheel. This wheel is mounted in a fork B, having a shank $b$ projecting upward a short distance and provided with a shoulder $b'$. The wagon body C is constructed as usual and supported at its rear end upon two wheels $c\ c$, said body being supported at its forward end upon the fork of the velocipede; a connecting frame D being employed to connect the said parts and also provide a seat for the operator. This connecting frame D comprises a flat spring metal bar $d$ which at its forward end is bent back upon itself and perforated to receive the shank of the fork so that said fork can turn freely therein to steer the vehicle. At its rear end the bar $d$ is rigidly attached to the bottom of the wagon at its forward end thus making the frame D virtually a part of the wagon in which the wheel fork turns. Connected with the bar $d$ about midway its length is a second flat spring bar $d'$ the upper end of which is curved rearward and supports a seat E while its lower end is bent at $d^2$ and $d^3$ in the form of a right angle so that said bar can be rigidly attached to the front of the wagon body and bar $d$. The bars $d$ and $d'$ shaped and connected as described form a skeleton frame which is very strong in itself, forms a firm support for the seat and also a rigid support for the forward end of the wagon.

The handle bar or tongue F is independent of the wheel fork B and is pivoted upon the wheel axle between the fork and crank pedals as clearly shown in Fig. 3. This handle bar or tongue comprises the forked portion $f$ which is connected with the axle, the shank $f'$ and steering head $f^2$. When the bar is raised it is used for steering the same as usual in an ordinary velocipede but when lowered it is adapted for use as a tongue so that the vehicle can be either propelled by foot power or drawn by hand.

A nut G is secured upon the upper end of the fork shank to prevent the connecting frame becoming disengaged. While I have shown only one form of wagon it is obvious that other forms may be connected with the wheel fork and in fact such body might be dispensed with and the rear portion constructed the same as an ordinary velocipede.

The principal advantages of my invention are that it is cheap and easily constructed, exceedingly durable, and the peculiar construction and arrangement of the handle bar enables it to be used either as a steering head or wagon tongue.

Having thus described my invention, what I claim, and desire to secure by Letters Patent, is—

1. The combination with a steering wheel and fork of the spring bar frame composed of the bars $d$ and $d'$ shaped and connected as described, the seat supported by the bar $d'$ and the wagon body connected to the rear ends of the said bar, substantially as shown and described.

2. The combination with the steering wheel and fork of the independent handle bar or tongue, the wagon body and the connecting frame comprising the bars $d$ and $d'$, the bar $d'$ being bent at $d^2$ and $d^3$ and the seat carried upon the upper end of the bar $d'$, substantially as shown and described.

In testimony whereof I affix my signature in presence of two witnesses.

WILLIAM C. FOSTER.

Witnesses:
 JOHN JACOB ESCH,
 WALTER CLARENCE WINTER.